US012404576B2

(12) United States Patent
Kimura et al.

(10) Patent No.: US 12,404,576 B2
(45) Date of Patent: Sep. 2, 2025

(54) SYSTEM AND METHOD OF PERFORMING A METAL COATING PROCESS USING INDUCTION HEATING TECHNIQUES

(71) Applicant: DAI-ICHI HIGH FREQUENCY CO., LTD., Tokyo (JP)

(72) Inventors: Sojiro Kimura, Tokyo (JP); Shuichiro Miyata, Tokyo (JP); Takashi Kogin, Tokyo (JP)

(73) Assignee: DAI-ICHI HIGH FREQUENCY CO., LTD., Tokyo (JP)

( * ) Notice: Subject to any disclaimer, the term of this patent is extended or adjusted under 35 U.S.C. 154(b) by 736 days.

(21) Appl. No.: 17/594,715

(22) PCT Filed: May 25, 2020

(86) PCT No.: PCT/JP2020/020632
§ 371 (c)(1),
(2) Date: Oct. 27, 2021

(87) PCT Pub. No.: WO2020/241602
PCT Pub. Date: Dec. 3, 2020

(65) Prior Publication Data

US 2022/0195577 A1 Jun. 23, 2022

Related U.S. Application Data

(60) Provisional application No. 62/852,553, filed on May 24, 2019.

(51) Int. Cl.
*C23C 4/18* (2006.01)
*C23C 4/08* (2016.01)
(Continued)

(52) U.S. Cl.
CPC .................. *C23C 4/18* (2013.01); *C23C 4/08* (2013.01); *C23C 4/16* (2013.01); *H05B 6/06* (2013.01); *H05B 6/101* (2013.01)

(58) Field of Classification Search
None
See application file for complete search history.

(56) References Cited

U.S. PATENT DOCUMENTS 6,202,418 B1 * 3/2001 Gabrielli ............... F28F 21/082 60/671
2009/0311545 A1 12/2009 Gerke et al.
2013/0037178 A1 * 2/2013 Coryell .................. C21D 1/673 72/47

FOREIGN PATENT DOCUMENTS

EP 0742680 A2 11/1996
JP H11-209865 A 8/1999
(Continued)

OTHER PUBLICATIONS

International Search Report and Written Opinion for PCT/JP2020/020632, mailed Oct. 1, 2020.

*Primary Examiner* — Xiaowei Su
(74) *Attorney, Agent, or Firm* — Greer, Burns & Crain, Ltd

(57) ABSTRACT

A method of fusing an alloy-based material with a coating layer using a thermal spray process. The method includes determining a predetermined energization frequency of a high-frequency power supply unit based on a diffused area thickness (T1) and a non-diffused area thickness (T2) of the alloy-based material, inductively heating the alloy-based material and the coating layer to reach a predetermined temperature at the predetermined energization frequency of the high-frequency power supply unit, selectively heating the alloy-based material at the predetermined energization frequency within a penetration depth range of a total thickness (D2) of the alloy-based material to suppress an austenite transformation of at least a portion of the alloy-based material, and fusing the selectively heated alloy-based material with the coating layer by suppressing the austenite
(Continued)

transformation of at least the portion of the alloy-based material.

4 Claims, 3 Drawing Sheets

(51) Int. Cl.

| | |
|---|---|
| ***C23C 4/16*** | (2016.01) |
| ***H05B 6/06*** | (2006.01) |
| ***H05B 6/10*** | (2006.01) |

(56) References Cited

FOREIGN PATENT DOCUMENTS

| | | | |
|---|---|---|---|
| JP | 2006-233310 | A | 9/2006 |
| JP | 2006-233311 | A | 9/2006 |
| WO | 9906607 | A1 | 2/1999 |
| WO | 2006/120987 | A1 | 11/2006 |

* cited by examiner

SYSTEM AND METHOD OF PERFORMING A METAL COATING PROCESS USING INDUCTION HEATING TECHNIQUES

BACKGROUND

The present invention relates to metal coating processes, and more specifically relates to a thermal spray process using induction heating techniques for alloy-based materials.

Metal tubes or pipes made of metallic elements and alloy-based materials are used in a variety of industries. Different industries are using tubing pieces for various reasons. In one example, the tubing can be made from a combination of alloy-based materials which are selected according to which industry or purpose the tubing will serve, and such tubing pieces can be used to transport fuel or heat materials. In another example, the tubing can be manufactured into many shapes and thicknesses from oval and round, to rectangular and round, and also there may be flat tubes. Some tubes can be formed into coil shapes as well.

Typically, tubing applications require protection against corrosion, erosion, or wear and tear. Existing metal coating processes, such as a thermal spraying technique, has been developed to protect the tubes. For example, using the thermal spraying technique, finely divided metallic or non-metallic materials are deposited on outer surfaces of the tubes in a molten or semi-molten state to form a protective coating on the outer surfaces. The coating material may be a powder, ceramic rod, wire or molten material. A thermal spray procedure can be used during a metal spray coating process.

During the metal spray coating process, the protective coating is heated to reach an austenitization state for fusing the protective coating with the outer surfaces of the tubes (i.e., austenite transformation). Austenitizing is a heat treatment process of steel and other ferrous alloy-based materials where these materials are heated above their critical temperatures long enough to initiate a material transformation. A purpose of austenitizing steel and other ferrous alloy-based materials is to transform them into a desired shape and also to provide strength and resistance to the austenitized material. When an austenitized material is followed by a quenching or cooling process, the austenitized material becomes hardened. Then, the tubes and protective coating are annealed until the austenitized material turns into bainite or ausferrite.

However, during the cooling process, the heated tubes can expand and cause damage to the protective coating when using the alloy-based materials. For example, the protective coating can be broken or defused from the outer surfaces of the tubes, resulting in a progressive disintegration of the tubes. Such damage to the protective coating is undesirable and needs to be avoided to provide the stable quality, high productivity, and long service life of the tubes. Moreover, damaged tubes may be discarded and cause additional operational expenses and time.

Thus, there is a need to develop an enhanced thermal technique that overcomes one or more of the above-described disadvantages of the existing metal coating processes for the alloy-based materials.

SUMMARY

In one embodiment of the present disclosure, a method of fusing an alloy-based material with a coating layer using a thermal spray process is disclosed. The method includes determining a predetermined energization frequency of a high-frequency power supply unit based on a diffused area thickness and a non-diffused area thickness of the alloy-based material, inductively heating the alloy-based material and the coating layer to reach a predetermined temperature at the predetermined energization frequency of the high-frequency power supply unit, selectively heating the alloy-based material at the predetermined energization frequency within a penetration depth range of a total thickness of the alloy-based material to suppress an austenite transformation of at least a portion of the alloy-based material, and fusing the selectively heated alloy-based material with the coating layer by suppressing the austenite transformation of at least the portion of the alloy-based material.

In one example, the method further includes raising a current temperature of the alloy-based material at a temperature rising rate of at least 100 degrees Celsius per second.

In another example, the method further includes maintaining the predetermined temperature for a predetermined time period.

In yet another example, the method further includes cooling the alloy-based material to complete the austenite transformation of at least a portion of the alloy-based material.

In another embodiment of the present disclosure, a system of fusing an alloy-based material with a coating layer using a thermal spray process is disclosed. Included in the system are an induction heating device configured to inductively heat the alloy-based material with the coating layer, a heating induction coil connected to the induction heating device and configured to wind the alloy-based material with the coating layer, a power supply unit connected to the heating induction coil and configured to generate and pass a high-frequency current and reach an austenitization state for fusing the coating layer with an outer surface of the alloy-based material, and a controller configured to instruct the induction heating device to: selectively heat the alloy-based material at a predetermined energization frequency within a penetration depth range of a total thickness of the alloy-based material to suppress an austenite transformation of at least a portion of the alloy-based material, and fuse the selectively heated alloy-based material with the coating layer while suppressing the austenite transformation of at least the portion of the alloy-based material.

In one example, the controller is further configured to instruct the induction heating device to determine the predetermined energization frequency of the power supply unit based on a diffused area thickness and a non-diffused area thickness of the alloy-based material.

In another example, the controller is further configured to instruct the induction heating device to inductively heat the alloy-based material and the coating layer to reach a predetermined temperature at the predetermined energization frequency of the power supply unit.

In a variation, the controller is further configured to instruct the induction heating device to determine the predetermined energization frequency of the power supply unit that produces a predetermined ratio between the diffused area thickness and the non-diffused area thickness. In a further variation, the controller is further configured to instruct the induction heating device to calculate the predetermined ratio between the diffused area thickness and the non-diffused area thickness of the alloy-based material. In another variation, the predetermined ratio between the diffused area thickness and the non-diffused area thickness of the alloy-based material ranges between 1:2 and 1:10. In yet another variation, the predetermined ratio between the diffused area thickness and the non-diffused area thickness of the alloy-based material is approximately 1:5. In still another variation, the diffused area thickness of the alloy-based material is approximately twenty percent of a radial thickness of the alloy-based material, and the non-diffused area thickness of the alloy-based material is approximately eighty percent of the radial thickness of the alloy-based material. In still yet another variation, the controller is further configured to instruct the induction heating device to determine the predetermined energization frequency of the power supply unit such that at least the portion of the alloy-based material defined by the non-diffused area thickness of the alloy-based material is suppressed from reaching the austenitization state.

In yet another embodiment of the present disclosure, a system of fusing an alloy-based material with a coating layer using a thermal spray process is disclosed. Included in the system are an induction heating device configured to inductively heat the alloy-based material with the coating layer, a heating induction coil connected to the induction heating device and configured to wind the alloy-based material with the coating layer, a power supply unit connected to the heating induction coil and configured to generate and pass a high-frequency current and reach an austenitization state for fusing the coating layer with an outer surface of the alloy-based material, and a controller configured to instruct the induction heating device to: determine a predetermined energization frequency of the power supply unit that causes a predetermined ratio between a diffused area thickness of the alloy-based material and an non-diffused area thickness of the alloy-based material.

In one example, the controller is further configured to instruct the induction heating device to select the predetermined ratio between the diffused area thickness and the non-diffused area thickness.

In another example, the predetermined ratio between the diffused area thickness and the non-diffused area thickness causes that at least a portion of the alloy-based material defined by the non-diffused area thickness is suppressed from reaching the austenitization state.

In yet another example, the controller is further configured to instruct the induction heating device to inductively heat the alloy-based material and the coating layer to reach a predetermined treatment temperature at the predetermined energization frequency of the power supply unit.

In still another example, the controller is further configured to instruct the induction heating device to inductively heat the alloy-based material at the predetermined energization frequency of the power supply unit within a predetermined penetration depth range of a total thickness of the alloy-based material.

In still yet another example, the controller is further configured to instruct the induction heating device to raise a current temperature of the alloy-based material at a rate of at least 100 degrees Celsius per second.

In a variation, the controller is further configured to instruct the induction heating device to maintain the predetermined treatment temperature for a predetermined time period.

The methods, systems, and apparatuses disclosed herein may be implemented in any means for achieving various aspects. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Embodiments of the present disclosure will be described in detail herebelow with reference to the attached drawings.

Figure 1:
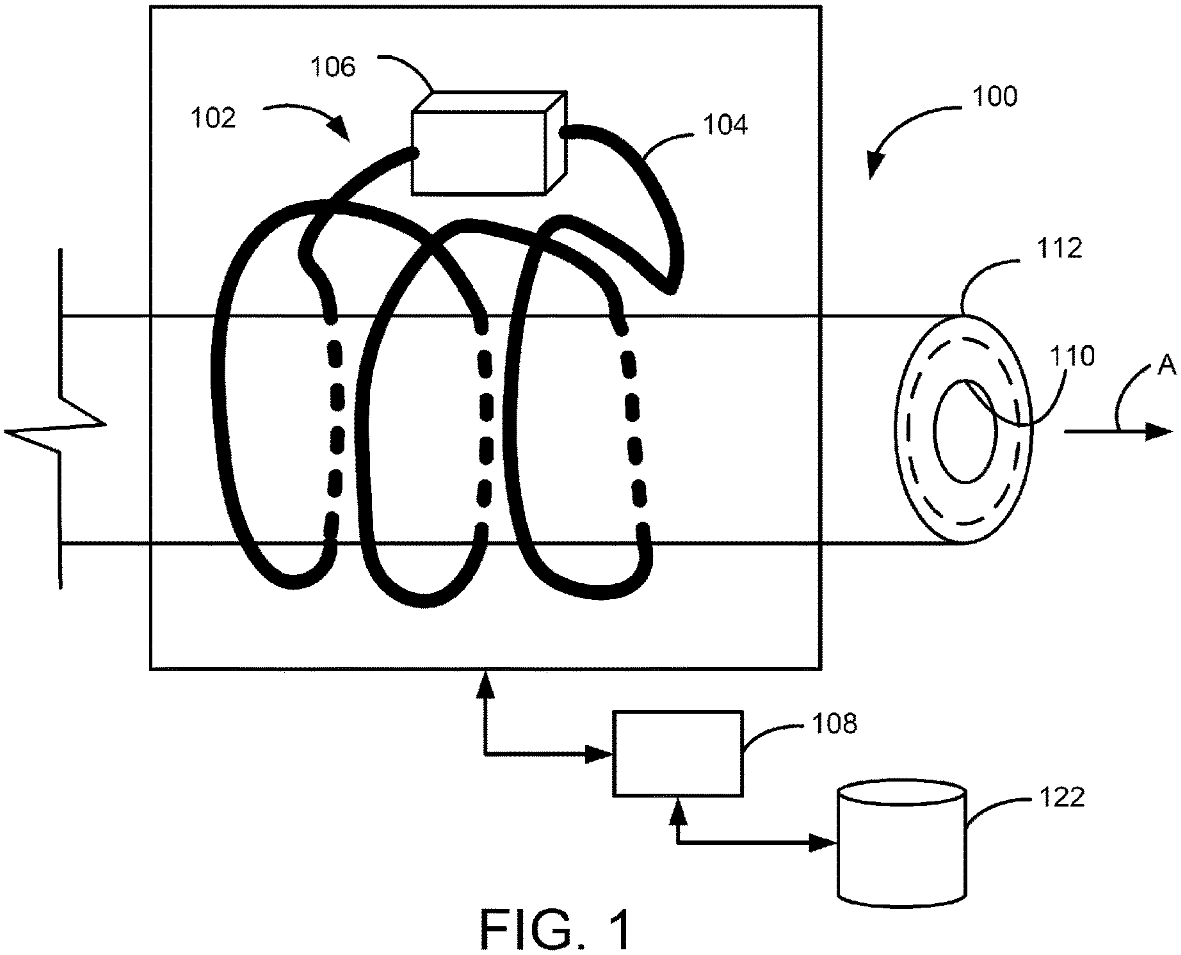
FIG. 1 illustrates a schematic diagram of an exemplary metal coating system having an induction heating device in accordance with embodiments of the present disclosure.

Referring now to FIG. 1, an exemplary metal coating system 100 having an induction heating device 102 is shown in accordance with embodiments of the present disclosure. In the illustrated embodiment, the metal coating system 100 includes the induction heating device 102 having a heating induction coil 104 and a high-frequency power supply unit 106. In embodiments, the metal coating system 100 also includes a control system 108 that is communicably connected to the induction heating device 102. The metal coating system 100 performs a metal coating process by selectively heating a metal tube 110 (i.e., an alloy base material) having a coating layer 112.

Typically, the metal tube 110 is thermally sprayed with the finely divided metallic materials to form the coating layer 112 as a protective coating on an outer surface of the metal tube 110. Existing coating techniques, such as thermal spray methods, can be used to create the coating layer 112. The coated metal tube 110 advances in a direction designated by an arrow A, and the coating layer 112 is inductively heated by the induction heating device 102 to reach an austenitization state for fusing the coating layer 112 with the outer surface of the metal tube 110.

Exemplary base materials of the metal tube 110 include carbon steels and chromium/molybdenum steels, e.g., American Society of Mechanical Engineers (ASME): SA213 T11, SA213 T12, or SA213 T22 alloy steel tubes (e.g., alloy-based materials). Other suitable base materials of the metal tube 110 are also contemplated to suit different applications. For example, the metal coating system 100 can also be used for non-alloy base materials of the metal tube 110. Exemplary chemical compositions of the coating layer 112 include one or more of nickel (Ni), chromium (Cr), silicon (Si), boron (B), molybdenum (Mo), and tungsten (W). Various mixtures of suitable chemical compositions of the coating layer 112 are also contemplated to suit different applications.

In FIG. 1, the heating induction coil 104 is formed by winding an electric conductor, e.g., a copper pipe, and is supported by an insulator (not shown) so that a substantially constant space is maintained between the heating induction coil 104 and the outer surface of the metal tube 110. A winding pitch of the heating induction coil 104 may be constant or may be varied. Exemplary arrangements of the metal tube 110 in the induction heating device 102 can be in a horizontal, vertical, or diagonal attitude to suit different applications. In this configuration shown in FIG. 1, the metal tube 110 having the coating layer 112 is heated by induction heating to fuse the coating layer 112.

As such, the induction heating technique is used to fuse the coating layer 112 with the metal tube 110 having the alloy-based materials. More specifically, to fuse the coating layer 112 onto the outer surface of the metal tube 110, the high-frequency power supply unit 106 generates and passes a high-frequency current enough to increase the temperature of the metal tube 110 to a predetermined treatment temperature, e.g., 750-780° C., for reaching the austenitization state.

A predetermined energization frequency of the high-frequency power supply unit 106 is selectively determined by the control system 108 based on a penetration depth calculation of the metal tube 110. In one embodiment, the penetration depth calculation refers to a measure of how closely electric current flows along a surface of a given material. Detailed descriptions of the penetration depth calculation for determining the predetermined energization frequency are provided below in paragraphs relating to FIG. 4.

Figure 2:
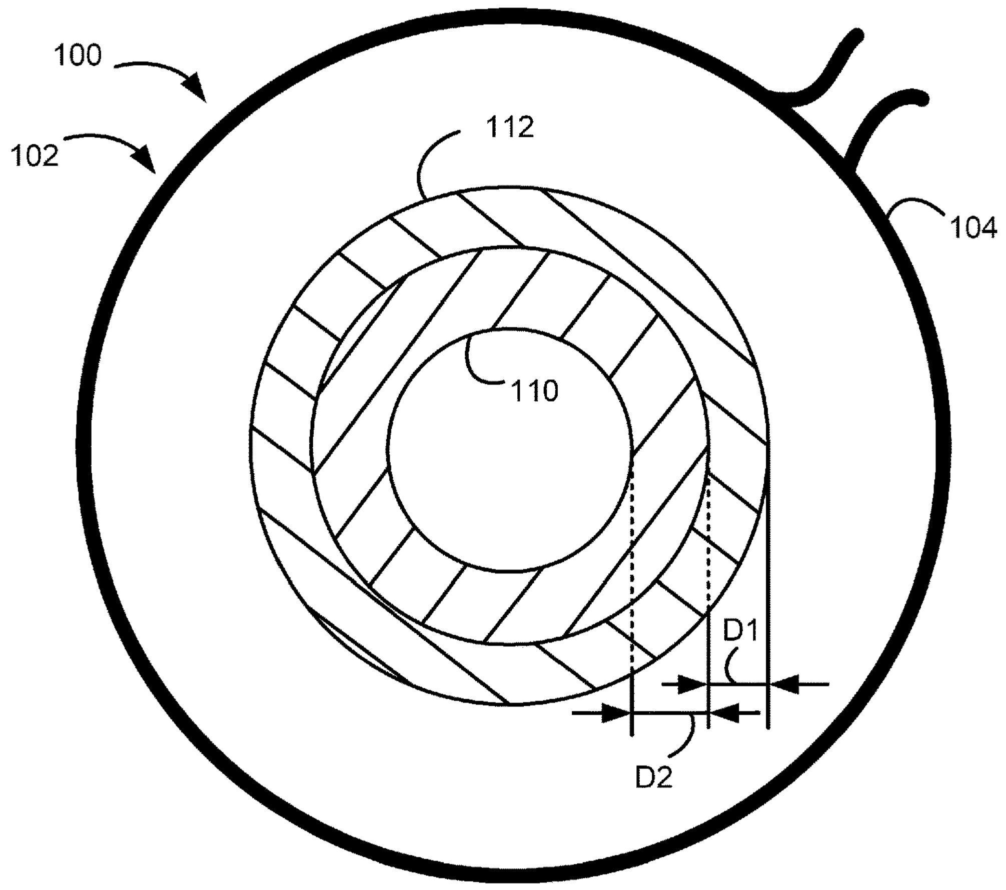
FIG. 2 is a cross-sectional view of an exemplary metal tube having a coating layer before performing a fusing process.
Figure 3:
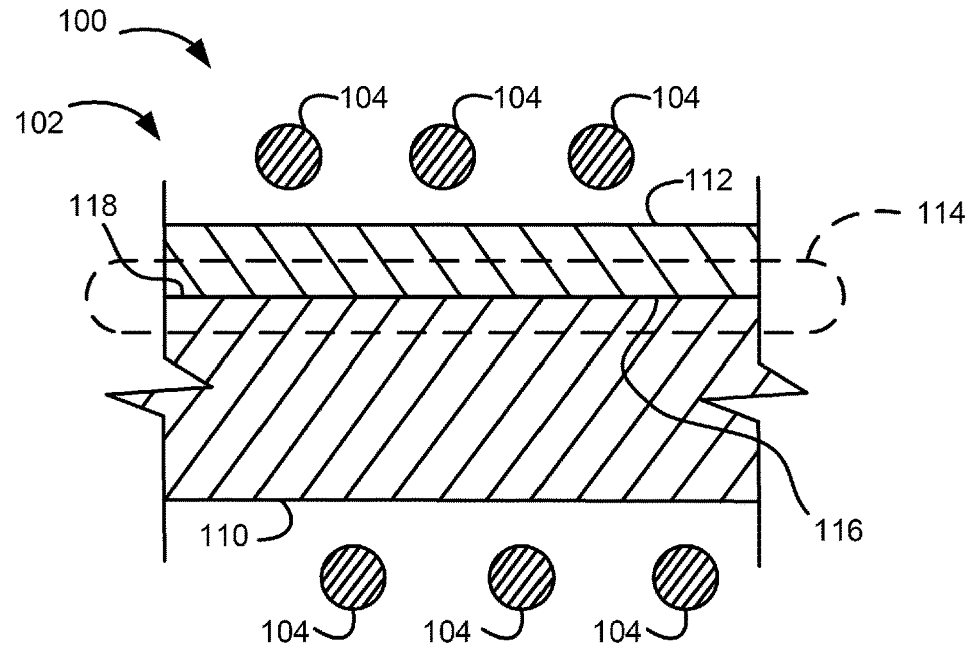
FIG. 3 is another cross-sectional view of an exemplary metal tube during the fusing process featuring the metal coating system shown in FIG. 1.

Referring now to FIGS. 2 and 3, the induction heating device 102 includes the heating induction coil 104 surrounding the metal tube 110 having the coating layer 112 to inductively heat the metal tube 110 and the coating layer 112. In embodiments, the coating layer 112 has a radial thickness D1 that is less than a radial thickness D2 of the metal tube 110. However, other thickness arrangements where D1 is greater than D2 are also contemplated. The high-frequency power supply unit 106 is used to inductively drive the heating induction coil 104. For example, the high-frequency power supply unit 106 drives the heating induction coil 104 to increase the temperature of the metal tube 110 and the coating layer 112 to the predetermined treatment temperature.

When the metal tube 110 and the coating layer 112 reaches the predetermined treatment temperature (e.g., 750-780° C.), a fused area 114 is formed between an outer surface 116 of the metal tube 110 and an inner surface 118 of the coating layer 112 by diffusion bonding. At the predetermined treatment temperature, at least a portion of the metal tube 110 in the fused area 114 and at least a portion of the coating layer 112 in the fused area 114 transition into the austenitization state.

In embodiments, the fused area 114 refers to a region where the outer surface 116 of the metal tube 110 and the inner surface 118 of the coating layer 112 are at least partially melted by diffusion bonding to form an integrated body as a single unit. As such, the metal tube 110 and the coating layer 112 are fused together for facilitating secure attachment. Other suitable bonding techniques, such as thermal bonding, welding, or soldering, are also contemplated to suit different applications.

Figure 4:
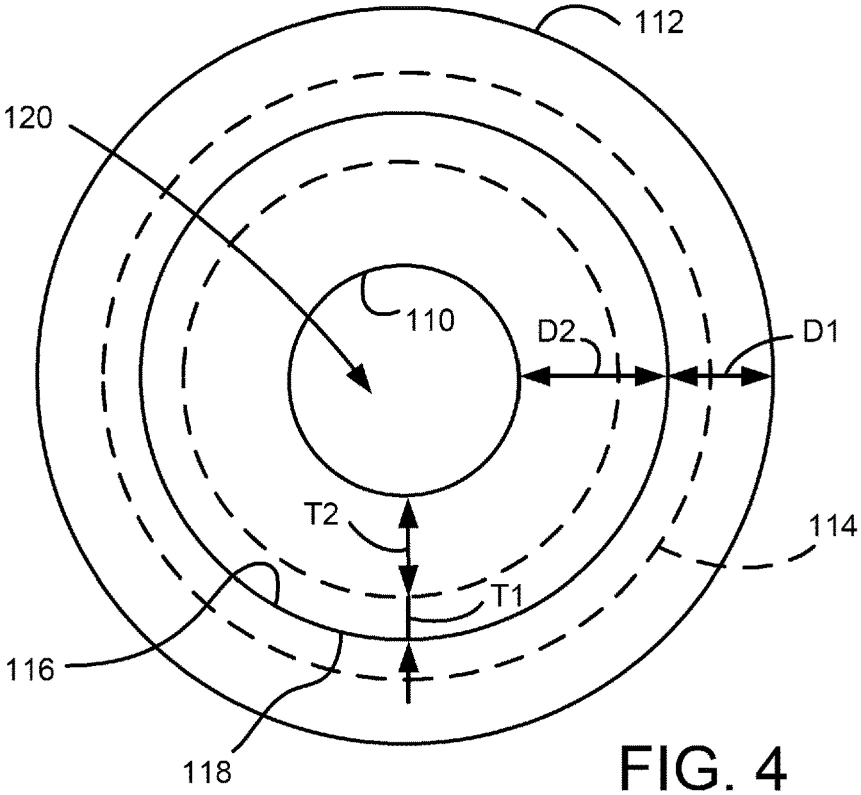
FIG. 4 is a side view of an exemplary metal tube during the fusing process featuring the metal coating system shown in FIG. 1.

Referring now to FIG. 4, since the heated metal tube 110 can radially expand and cause damage to the coating layer 112 during the cooling process, the control system 108 operates to minimize an effect of the radial expansion of the metal tube 110. For example, the cooling process can be achieved by introducing blasts of cold air into a central opening 120 of the metal tube 110.

In embodiments, the control system 108 determines a radial thickness T1 of the fused area 114 in the metal tube 110 as narrow as possible to prevent the radial expansion of the metal tube 110 but also to provide the secure attachment. In embodiments, the radial thickness T1 refers to a diffused area thickness in the metal tube 110. When the radial thickness T1 of the fused area 114 in the metal tube 110 is small enough, the effect of the radial expansion of the metal tube 110 can be either removed or at least alleviated during the cooling process.

In embodiments, the radial thickness T1 of the fused area 114 in the metal tube 110 can be determined using a penetration depth calculation of the metal tube 110 as shown in expression (1):

$$T1 = k * \sqrt{\frac{R}{f\mu}} \qquad (1)$$

wherein k denotes a constant coefficient, R denotes a resistivity of a material of the metal tube 110, f denotes a frequency of a current for the high-frequency power supply unit 106, and μ denotes a relative permeability of the material of the metal tube 110 with respect to a magnetic permeability of free space.

For example, the constant coefficient k can be 503 or 5.03, the resistivity R can be an inverse conductivity of the material of the metal tube 110 shown in ohms/meter (Ωm), the frequency f of the high-frequency power supply unit 106 can be shown in hertz (Hz), and the relative permeability μ can be a measure of magnetism of the material of the metal tube 110 (e.g., μ=1.0 when the material of the metal tube 110 is essentially nonmagnetic). As such, the control system 108 can selectively determine the predetermined energization frequency of the high-frequency power supply unit 106 based on the penetration depth calculation of the metal tube 110 using expression (1).

In some embodiments, the control system 108 also calculates a ratio between the radial thickness T1 of the fused area 114 in the metal tube 110 and a radial thickness T2 of a non-diffused area in the metal tube 110. In embodiments, the radial thickness T2 refers to a non-diffused area thickness in the metal tube 110. For example, the non-diffused area of the metal tube 110 is defined by a radial distance difference between the radial thickness D2 of the metal tube 110 and the radial thickness T1 of the fused area 114 in the metal tube 110.

An exemplary non-diffused area thickness T2 is shown below in expression (2):

$$T2 = D2 - T1 \qquad (2)$$

wherein T1 denotes the diffused area thickness in the metal tube 110, T2 denotes the non-diffused area thickness in the metal tube 110, and D2 denotes the radial thickness of the metal tube 110.

Exemplary ratios between the diffused area thickness T1 and the non-diffused area thickness T2 range between 1:2 – 1:10. In one embodiment, the ratio between the diffused area thickness T1 and the non-diffused area thickness T2 can be 1:5 where the diffused area thickness T1 is 20 percent (%) of the radial thickness D2 of the metal tube 110, and the non-diffused area thickness T2 is 80% of the radial thickness D2 of the metal tube 110.

In one example, a desired ratio between the diffused area thickness T1 and the non-diffused area thickness T2 can be 1:5 (i.e., no damage occurs on the coating layer 112 during the cooling process). The control system 108 determines the predetermined energization frequency of the high-frequency power supply unit 106 that produces or causes the desired ratio of 1:5 between the diffused area thickness T1 and the non-diffused area thickness T2.

For example, the desired ratio can be determined based on the penetration depth calculation of the metal tube 110 using expression (1). The desired ratio and/or relevant data can be stored in memory or database 122 (FIG. 1) that is communicably coupled to the control system 108 for subsequent retrieval during the metal coating process performed by the metal coating system 100.

In one embodiment, the memory 122 consists of a combination of random-access memory ("RAM") and magnetic media such as tapes and disks, but some computer systems may use optical media and other storage devices. Depending on the requirements of the metal coating system 100, a database server can be used that might be anything from a desktop personal computer with a hard disk and commercially available database software to a large mainframe computer with multiple tape drives and specially designed database software. Other suitable systems are also contemplated to suit different applications.

Figure 5:
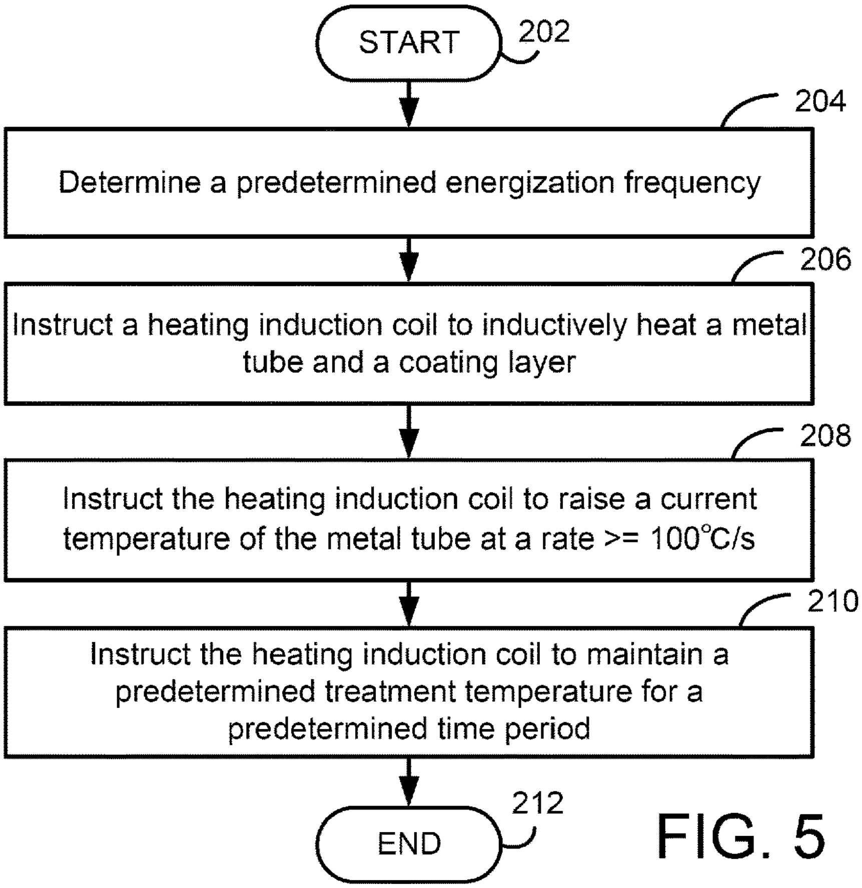
FIG. 5 is a flow chart of an exemplary method of performing a metal coating process using the metal coating system of FIG. 1 in accordance with embodiments of the present disclosure.

Referring now to FIG. 5, a flow chart of an exemplary method 200 of performing a metal coating process by selectively heating the metal tube 110 having the coating layer 112 using the metal coating system 100 in accordance with embodiments of the present disclosure. The method 200 is shown in relation to FIGS. 1-4.

The method 200 can be implemented by the control system 108 that is communicably connected to the induction heating device 102. In one embodiment, the steps implementing the method 200 may be in the form of computer readable program instructions stored in one of memories of electronic controllers in the control system 108 and executed by a respective processor of the electronic controllers, or other computer usable medium.

In another embodiment, the steps implementing the method 200 may be stored and executed on a module or controller, such as the control system 108, which may or may not be independent from one of the electronic controllers of the metal coating system 100. The method 200 may run continuously or may be initiated in response to one or more predetermined events, such as an initial push of a start button (not shown). Any steps of the method 200 can be executed in any order suitable for the application.

The method 200 begins in step 202. In step 204, the control system 108 determines the predetermined energization frequency of the high-frequency power supply unit 106 that produces or causes the desired ratio between the diffused area thickness T1 and the non-diffused area thickness T2. In embodiments, the desired ratio between the diffused area thickness T1 and the non-diffused area thickness T2 is selected to suppress a portion of the metal tube 110 defined by the non-diffused area thickness T2 from reaching the austenitization state.

In step 206, the control system 108 instructs the heating induction coil 104 to inductively heat the metal tube 110 and the coating layer 112 to reach the predetermined treatment temperature (e.g., 750-780° C.) at the predetermined energization frequency of the high-frequency power supply unit 106. In embodiments, the metal tube 110 is selectively and inductively heated at the predetermined energization frequency within a penetration depth range, such as the diffused area thickness T1, of a total thickness, such as the radial thickness D2, of the metal tube 110 to suppress the austenite transformation of the portion of the metal tube 110 defined by the non-diffused area thickness T2.

In step 208, the control system 108 instructs the heating induction coil 104 to raise a current temperature of the metal tube 110 at a rate of 100 degrees Celsius per second (° C./s) or more (greater than 100° C./s) during the metal coating process. In one example, the rate can be 1,000° C./s during the metal coating process to suit the application.

In step 210, the control system 108 instructs the heating induction coil 104 to maintain the predetermined treatment temperature for a predetermined time period. In embodiments, the predetermined treatment temperature at the outer surface 116 of the metal tube 110 is maintained for less than or equal to 10 seconds for fusing the metal tube 110 and the coating layer 112.

After fusing, the metal tube 110 can be cooled with the cold air without damaging the coating layer 112 during the cooling process. A present shape of the metal tube 110 is substantially unchanged without unwanted volumetric expansion because the portion of the metal tube 110 defined by the non-diffused area thickness T2 holds the present shape of the metal tube 110.

This is possible because the portion of the metal tube 110 defined by the non-diffused area thickness T2 is suppressed from reaching the austenitization state, and thus the present shape of the metal tube 110 is sustained. In this way, the metal coating system 100 provides an enhanced thermal technique that lowers or eliminates a number of tubes having damaged coating layers, thereby reducing the operational expenses and time.

The method 200 ends in step 212 and control may return to step 202. One or more of steps 204-210 can be repeated as desired.

It should be appreciated that any steps of the method 200 described herein may be implemented by a process controller, or other similar component, of the control system 108. Specifically, the process controller may be configured to execute computer readable instructions for performing one or more steps of the method 200. In one embodiment, the process controller may also be configured to transition from an operating state, during which a larger number of operations are performed, to a sleep state, in which a limited number of operations are performed, thus further reducing quiescent power draw of an electrical power source for the metal coating system 100.

The present disclosure is more easily comprehended by reference to the specific embodiments, examples and drawings recited hereinabove which are representative of the present disclosure. It must be understood, however, that the same are provided for the purpose of illustration, and that the present disclosure may be practiced otherwise than as specifically illustrated without departing from its spirit and scope. As will be realized, the present disclosure is capable of various other embodiments and that its several components and related details are capable of various alterations, all without departing from the basic concept of the present disclosure. Accordingly, descriptions will be regarded as illustrative in nature and not as restrictive in any form whatsoever. Modifications and variations of the system, method, and apparatus described herein will be obvious to those skilled in the art. Such modifications and variations are intended to come within the scope of the appended claims.

The invention claimed is:

1. A method of fusing metallic alloy material with a coating layer using a thermal spray process, the method comprising:

determining, with a control unit, a predetermined energization frequency of a power supply unit based on a determination by a control unit of a ratio between a diffused area radial thickness (T1) and a non-diffused area radial thickness (T2) of the metallic alloy material;

inductively heating the material and the coating layer to reach a predetermined temperature at the predetermined energization frequency of the power supply unit based on said ratio;

selectively heating the material at the predetermined energization frequency within a penetration depth range of a total thickness (D2) of the material; and fusing the selectively heated material with the coating layer.

2. The method of claim 1, further comprising raising a current temperature of the material at a temperature rising rate of at least 100 degrees Celsius per second.

3. The method of claim 1, further comprising maintaining the predetermined temperature for a predetermined time period.

4. The method of claim 1, further comprising cooling the material to complete an austenite transformation of at least a portion of the material to achieve the fusing of the coating with the material.

* * * * *